(12) United States Patent
Nagaoka et al.

(10) Patent No.: US 6,206,580 B1
(45) Date of Patent: Mar. 27, 2001

(54) OPTICAL CONNECTOR

(75) Inventors: Yasutaka Nagaoka; Nobuhiko Suzuki, both of Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 09/209,427

(22) Filed: Dec. 11, 1998

(30) Foreign Application Priority Data

Dec. 12, 1997 (JP) .................................................... 9-342968

(51) Int. Cl.⁷ ........................................................ G02B 6/36
(52) U.S. Cl. ............................................................ 385/78
(58) Field of Search .................................. 385/78, 60, 62, 385/76, 77, 81, 86, 87, 88, 89, 139, 72, 55, 56, 59, 75

(56) References Cited

U.S. PATENT DOCUMENTS

| | | | |
|---|---|---|---|
| 5,675,682 | * 10/1997 | De Marchi | 385/77 |
| 5,692,080 | * 11/1997 | Lu | 385/60 |
| 5,712,938 | * 1/1998 | Lin et al. | 385/59 |
| 5,923,805 | * 7/1999 | Anderson et al. | 385/86 |

FOREIGN PATENT DOCUMENTS 59-147308    8/1984    (JP) .................................. G02B/7/26

* cited by examiner

*Primary Examiner*—Frank G. Font
*Assistant Examiner*—Michael P. Stafira
(74) *Attorney, Agent, or Firm*—Sughrue, Mion, Zinn, Macpeak & Seas, PLLC (57) ABSTRACT

An optical connector 21 includes optical connector plugs 2 and 2, a ferrule holder 22, and a connector housing 23, and the ferrule holder 22, in which the optical connector plugs 2 and 2 are removably received, is removably fitted in the connector housing 23. plug-introducing slits 33 and 33 are formed respectively through opposite side walls 32 and 32 of the ferrule holder 22 and also through part of a rear wall 26 thereof so that the optical connector plugs 2 and 2 can be removably mounted on the ferrule holder. The connector housing 23 has an elastic retaining piece portion 46 engageable with the ferrule holder 22 to prevent the withdrawal of the ferrule holder 22 from the connector housing, and the engagement of this elastic retaining piece portion can be canceled.

11 Claims, 6 Drawing Sheets

OPTICAL CONNECTOR

BACKGROUND OF THE INVENTION

1. Field of the Invention

This invention relates to an optical connector connected to ends of photoconductive members, such as optical fibers, so as to connect optical transmission circuits together.

2. Prior Art

Figure 7:
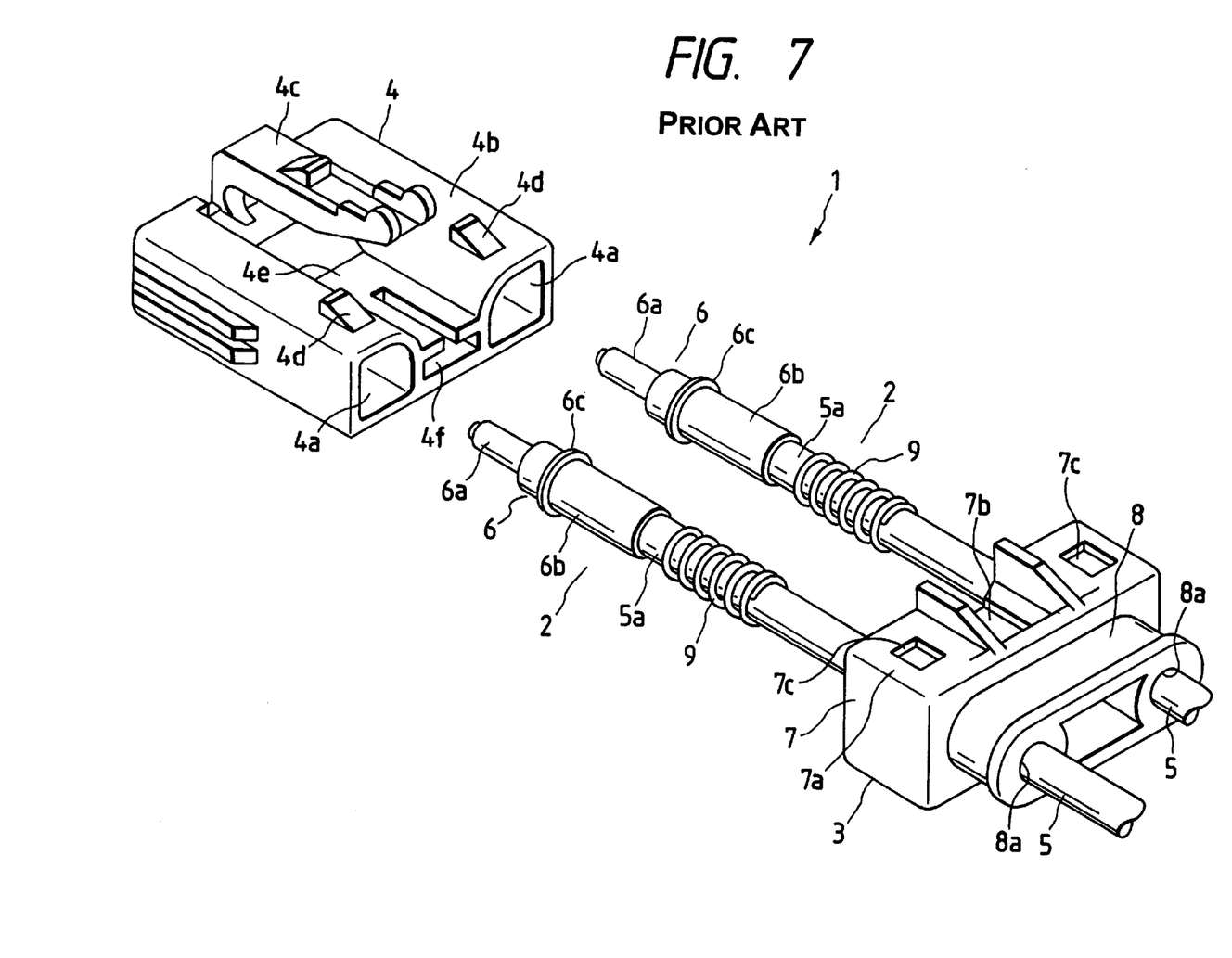
FIG. 7 is an exploded, perspective view of a conventional optical connector.

FIG. 7 shows one known conventional optical connector.

In this Figure, the optical connector 1 comprises optical connector plugs 2 and 2, a ferrule holder 3, and a connector housing 4.

Each of the optical connector plugs 2 and 2 comprises a photoconductive member 5 (e.g. optical fiber), and a cylindrical ferrule 6 having a smaller-diameter portion 6a and a larger-diameter portion 6b. A conductor portion (not shown) of each of the photoconductive members 5 and 5 is received in the smaller-diameter portion 6a, and a sheath 5a thereof is received in the larger-diameter portion 6b.

The ferrule holder 3 includes a box-like housing 7, having a front end surface part of which is open for the optical connector plugs 2, and a support wall 8 of an oval cross-section formed integrally on a rear end surface of the housing 7. A recess 7b is formed in a central portion of an upper wall 7a of the housing 7, and rectangular retaining holes 7c and 7c are formed in this upper wall 7a, and are disposed respectively on opposite sides of the recess 7b. Insertion holes 8a and 8a for respectively passing the pair of photoconductive members 5 and 5 therethrough are formed through the support wall 8.

The connector housing 4 includes hollow plug-receiving chambers 4a and 4a for respectively receiving the optical connector plugs 2 and 2, and a lock arm 4c for engagement with a housing of a mating connector (not shown) is formed on a front end portion of an upper wall 4b of this connector housing, and retaining projections 4d and 4d, corresponding respectively to the retaining holes 7c and 7c, are formed on a rear end portion of the upper wall 4b. A recess 4e is formed in a central portion of the upper wall 4b, and a guide portion 4f for the ferrule holder 3 is formed in communication with the recess 4e.

Figure 8:
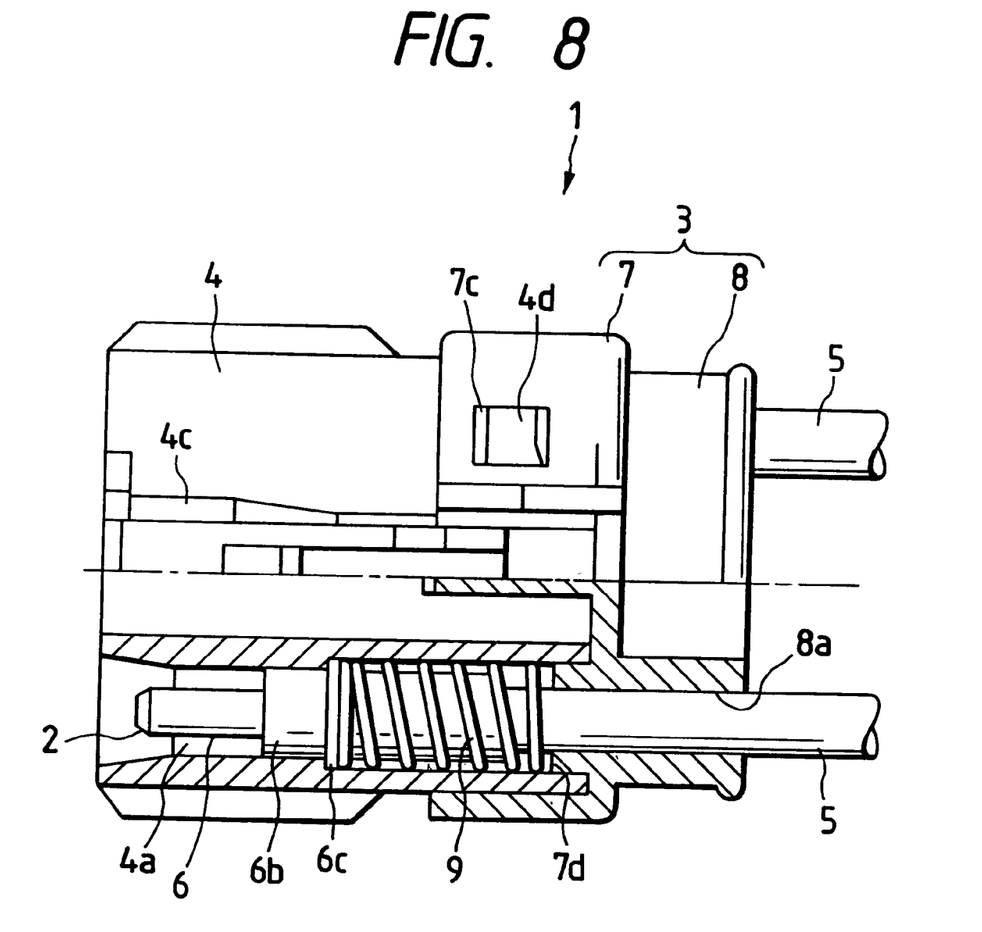
FIG. 8 is a cross-sectional view showing a connector housing and a ferrule holder of FIG. 7 fitted together.

In the above construction, before forming each of the optical connector plugs 2 and 2, the photoconductive member 5 is first passed through the ferrule holder 3, and then a compression coil spring (resilient member) 9 is mounted on the photoconductive member 5. As the ferrule holder 3 is connected, together with the optical connector plugs 2 and 2, to the connector housing 4, the ferrule holder 3 is guided by the guide portion 4f, and shown in FIG. 8, the retaining projections 4d and 4d (only one of which is shown in FIG. 8) on the connector housing 4 are firmly engaged respectively in the retaining holes 7c and 7c (only one of which is shown in FIG. 8) in the ferrule holder 3, thereby forming the optical connector 1 which is now ready for connection to the housing of the mating connector (not shown).

In this condition, each optical connector plug 2 has a slight play because of the resilient force of the compression coil spring 9 acting between an engagement projection 6c, formed on the outer surface of the larger-diameter portion 6b of the ferrule 6 over an entire periphery thereof, and an engagement portion 7d formed within the housing 7.

In the above prior art, before forming the optical connector plugs 2 and 2, the photoconductive members 5 and 5 must be passed through the ferrule holder 3, and therefore there has been encountered a problem that the efficiency of the operation can not be enhanced because of this cumbersome operation.

And besides, the ferrule holder 3 and the connector housing 4 are firmly engaged with each other, and therefore for example, even when it becomes necessary to effect the maintenance of the optical connector 1 or to exchange the connector housing 4, the engagement between the ferrule holder 3 and the connector housing 4 can not be easily canceled, and in some cases there is a possibility that this leads to damage to these parts.

Furthermore, since the optical connector plug 2 is formed at the end portion of the photoconductive member 5, the photoconductive member 5 can not be removed from the ferrule holder 3, which leads to a problem that the optical connector 1 can not have extensibility.

SUMMARY OF THE INVENTION

The present invention seeks to overcome the above-mentioned problems, and an object of the invention is to provide an optical connector which can be easily assembled, and has extensibility, and in which the efficiency of the operation, as well as the efficiency of the maintenance, is greatly enhanced.

An optical connector of the present invention, which has been made in order to solve the above problems, comprises an optical connector plug comprising a photoconductive member, and a ferrule receiving and retaining an end portion of the photoconductive member therein; a ferrule holder urging the ferrule through a resilient member mounted on the optical connector plug; and a connector housing for fitting connection to a housing of a mating connector; CHARACTERIZED in that the ferrule holder, in which the optical connector plug is removably received, is removably fitted in the connector housing.

In the above construction, the optical connector comprises the optical connector plug, the ferrule holder, and the connector housing, and when the ferrule holder, in which the optical connector plug is removably received, is removably fitted in the connector housing, the optical connector is ready for connection to the housing of the mating connector. Thus, the optical connector plug is removably received in the ferrule holder, and then the ferrule holder is fitted, together with the optical connector plug, into the connector housing, and by doing so, the assembling operation can be effected easily, and the efficiency of the operation is greatly enhanced, and also the efficiency of the maintenance is greatly enhanced, and besides the extensibility can be obtained.

In the optical connector of the present invention, plug-introducing slits are formed respectively through opposite side walls of the ferrule holder and also through part of a rear wall of the ferrule holder so that the optical connector plugs can be removably mounted on the ferrule holder, and the connector housing has an elastic retaining piece portion engageable with the ferrule holder to prevent the withdrawal of the ferrule holder from the connector housing, and the engagement of the elastic retaining piece portion can be canceled.

In the above construction, the plug-introducing slits are formed respectively through the opposite side walls of the ferrule holder and also through part of the rear wall of the ferrule holder so that the optical connector plugs can be removably mounted on the ferrule holder, and the connector housing has the elastic retaining piece portion engageable with the ferrule holder to prevent the withdrawal of the ferrule holder from the connector housing, and the engagement of the elastic retaining piece portion can be canceled. Therefore, the optical connector plugs and the ferrule holder can be connected together quite easily, and such a cumbersome operation as required in the conventional construction is eliminated, and the efficiency of the maintenance is greatly enhanced, and the extensibility can be obtained.

In the optical connector of the present invention, support walls of a C-shaped cross-section for respectively supporting the photoconductive members are formed on the rear wall of the ferrule holder, and are disposed respectively at edge portions of the plug-introducing slits.

In the above construction, the support walls of a C-shaped cross-section for respectively supporting the photoconductive members are formed on the rear wall of the ferrule holder, and are disposed respectively at the edge portions of the plug-introducing slits, and therefore even though the plug-introducing slits are formed in the ferrule holder, the photoconductive members can be sufficiently supported.

In the optical connector of the present invention, an end portion of each of the support walls is curved.

In the above construction, the end portion of each of the support walls, formed on the rear wall of the ferrule holder, is curved, and therefore even when a bending force acts on the photoconductive member, this photoconductive member can be protected.

In the optical connector of the present invention, slit cover portions, corresponding respectively to the plug-introducing slits formed respectively in the opposite side walls of the ferrule holder, are formed respectively on opposite side walls of the connector housing.

In the above construction, the slit cover portions, corresponding respectively to the plug-introducing slits formed respectively in the opposite side walls of the ferrule holder, are formed respectively on the opposite side walls of the connector housing, and therefore when the ferrule holder is fitted into the connector housing, the plug-introducing slits, formed respectively in the opposite side walls, are covered with the slit cover portions, respectively, thereby preventing the movement of the optical connector plugs.

In the optical connector of the present invention, each of the slit cover portions has a support wall cover portion projecting beyond a rear end surface of the connector housing, and when the connector housing and the ferrule holder are fitted together, the support wall cover portions project respectively from those portions of the plug-introducing slits disposed at the rear wall of the ferrule holder, and face the support walls, respectively.

In the above construction, each of the slit cover portions, formed respectively on the opposite side walls of the connector housing, has the support wall cover portion for the support wall of the ferrule holder, and these support wall cover portions project beyond the rear end surface of the connector housing, and when the connector housing and the ferrule holder are fitted together, the support wall cover portions project respectively from those portions of the plug-introducing slits disposed at the rear wall of the ferrule holder, and face the support walls, respectively, hereby limiting the movement of the photoconductive members relative to the support walls.

In the optical connector of the present invention, guide grooves are formed respectively in the slit cover portions of the connector housing, and extend in a direction of insertion of the optical connector plugs, and elongate guide projections, corresponding respectively to the guide grooves, are formed respectively on inner surfaces of the opposite side walls of the ferrule holder.

In the above construction, the guide grooves are formed respectively in the slit cover portions of the connector housing, and extend in the direction of insertion of the optical connector plugs, and the elongate guide projections, corresponding respectively to the guide grooves, are formed respectively on the inner surfaces of the opposite side walls of the ferrule holder, and therefore the assembling operation can be effected easily, and the efficiency of the operation can be enhanced.

In the optical connector of the present invention, at least two plug receiving chambers for respectively receiving the optical connector plugs are formed in the connector housing, and a recessed portion is formed in a rear portion of a lower wall of the connector housing, and separates the plug receiving chambers from each other, and the elastic retaining piece portion is formed at the recessed portion, and a retaining portion for the elastic retaining piece portion is formed on a lower wall of the ferrule holder.

In the above construction, at least two plug receiving chambers for respectively receiving the optical connector plugs are formed in the connector housing, and the recessed portion is formed in the rear portion of the lower wall of the connector housing, and separates the plug receiving chambers from each other, and the elastic retaining piece portion is formed at the recessed portion, and the retaining portion for the elastic retaining piece portion is formed on the lower wall of the ferrule holder, and therefore the space efficiency is greatly enhanced as compared with the conventional optical connector.

In the optical connector of the present invention, the retaining portion has an L-shaped cross-section in a direction of an axis of the ferrule holder, and one wall of the retaining portion is engaged with the elastic retaining piece portion, and the other wall thereof serves to protect the engagement of the elastic retaining piece portion.

In the above construction, the retaining portion, formed on the lower wall of the ferrule holder, has an L-shaped cross-section in the direction of the axis of the ferrule holder, and one wall of this retaining portion is engaged with the elastic retaining piece portion, and the other wall thereof serves to protect the engagement of the elastic retaining piece portion, and therefore the ferrule holder is prevented from being easily disengaged from the connector housing by an external force.

In the optical connector of the present invention, in which a retention cancellation jig-inserting hole is formed in the connector housing, and extends from a front end surface of the connector housing, and communicates with the recessed portion.

In the above construction, the retention cancellation jig-inserting hole is formed in the connector housing, and extends from the front end surface of the connector housing, and communicates with the recessed portion, and therefore the ferrule holder can be easily withdrawn from the connector housing.

DETAILED DESCRIPTION OF THE PREFERRED EMBODIMENTS

One preferred embodiment of the present invention will now be described with reference to the drawings.

Figure 1:
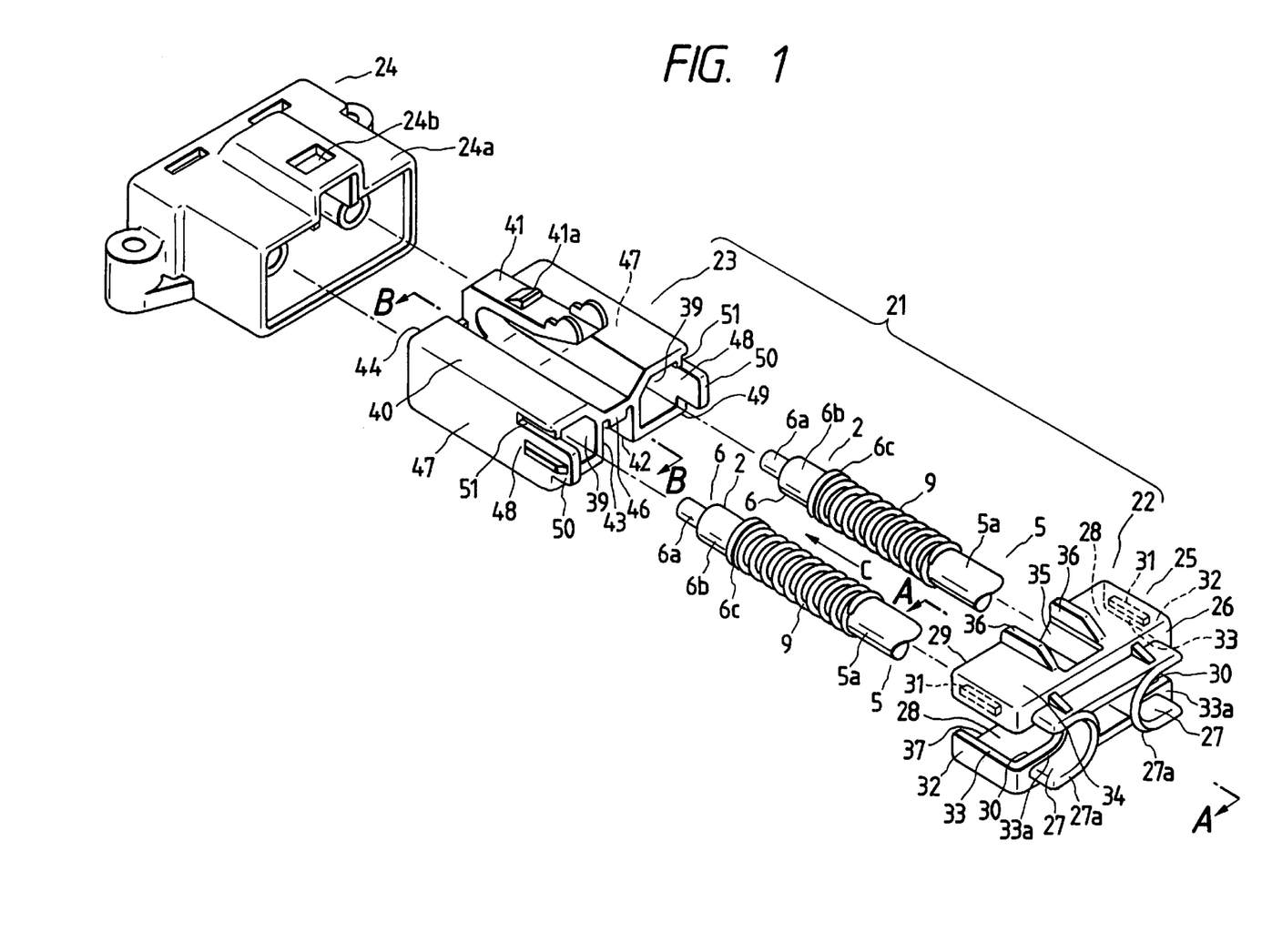
FIG. 1 is an exploded, perspective view of one preferred embodiment of an optical connector of the present invention.
Figure 2:
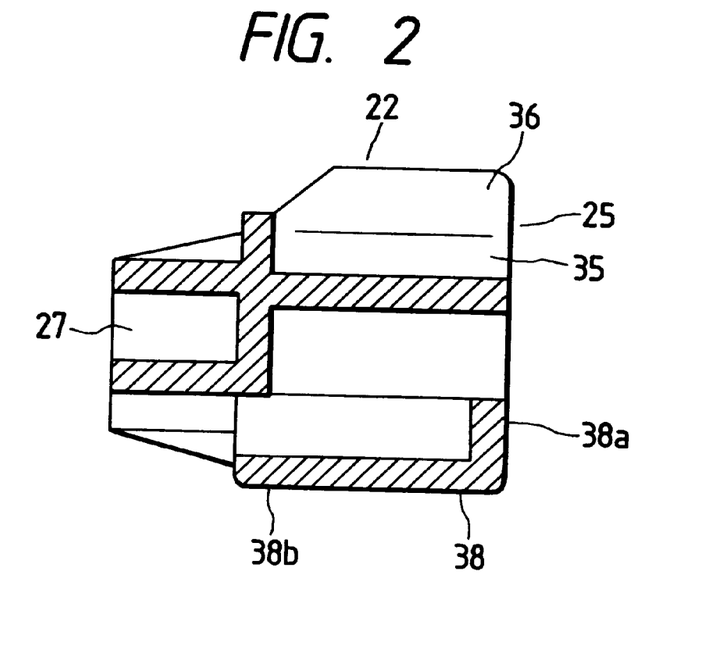
FIG. 2 is a cross-sectional view of a ferrule holder taken along the line A—A of FIG. 1.
Figure 3:
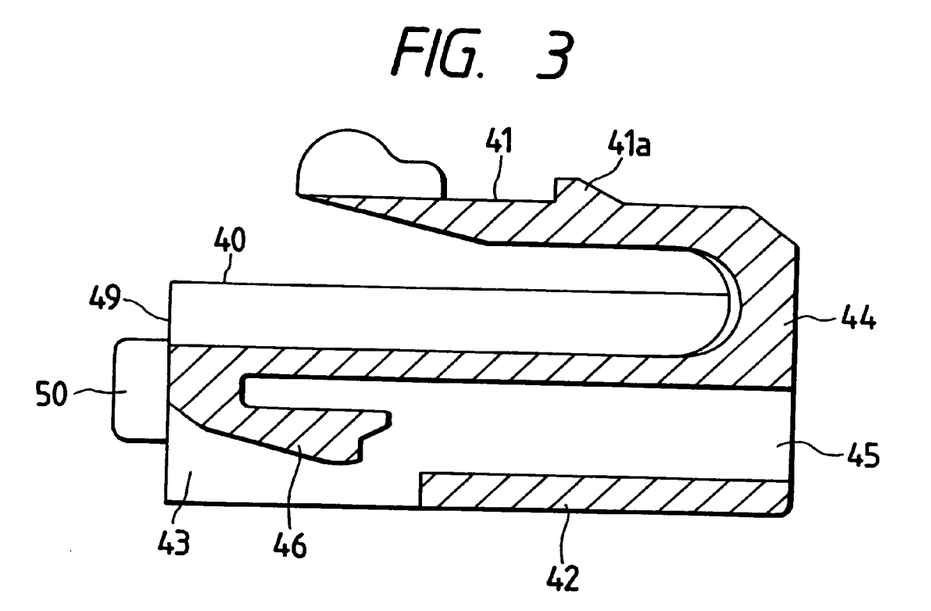
FIG. 3 is a cross-sectional view of a connector housing taken along the line B—B of FIG. 1.
Figure 4:
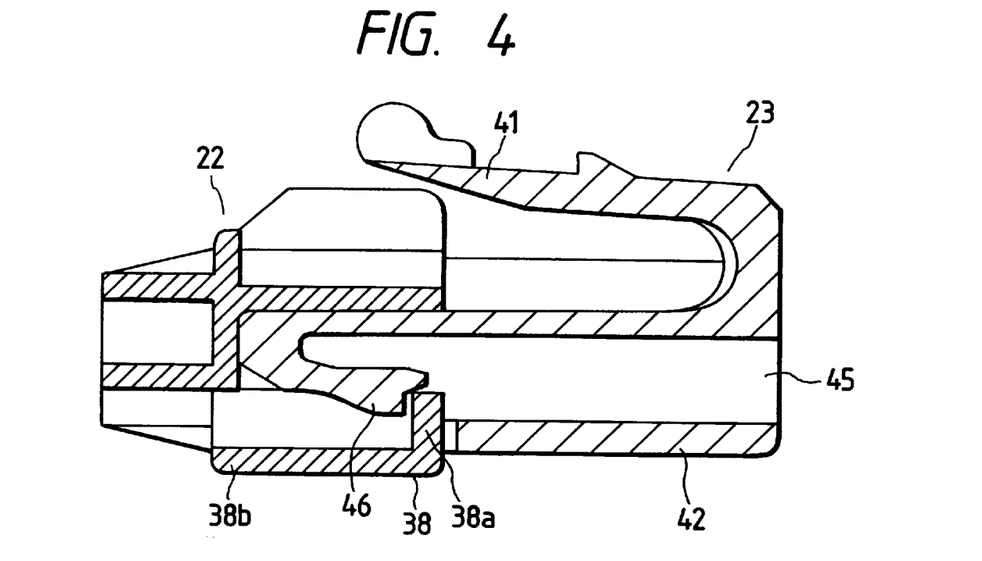
FIG. 4 is a cross-sectional view showing the connector housing and the ferrule holder of FIG. 1 fitted together.
Figure 5:
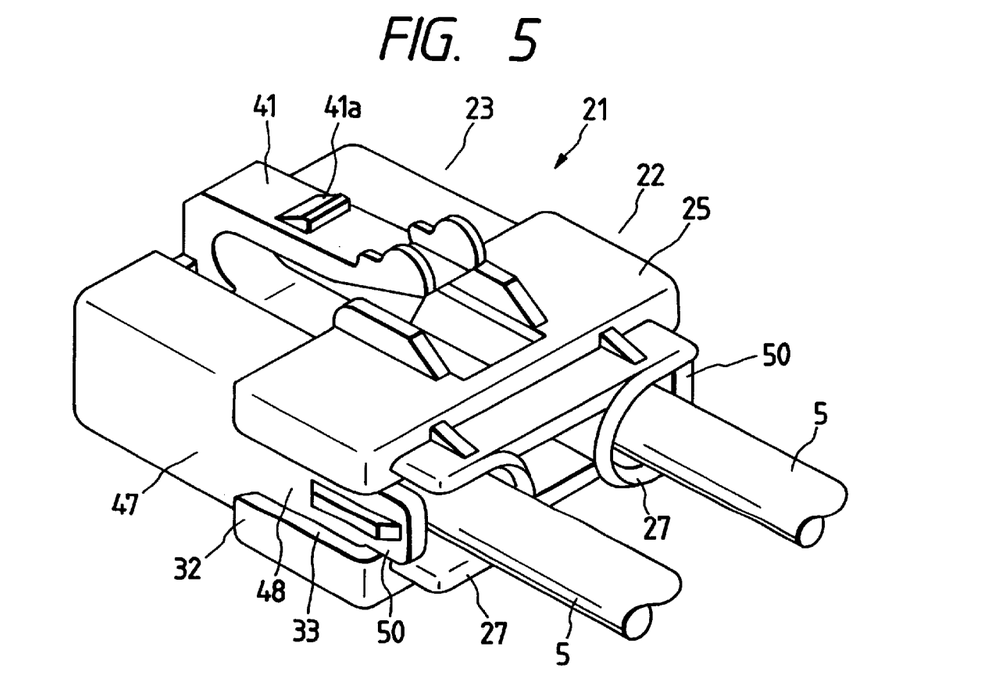
FIG. 5 is a perspective view showing the appearance of FIG. 4.
Figure 6:
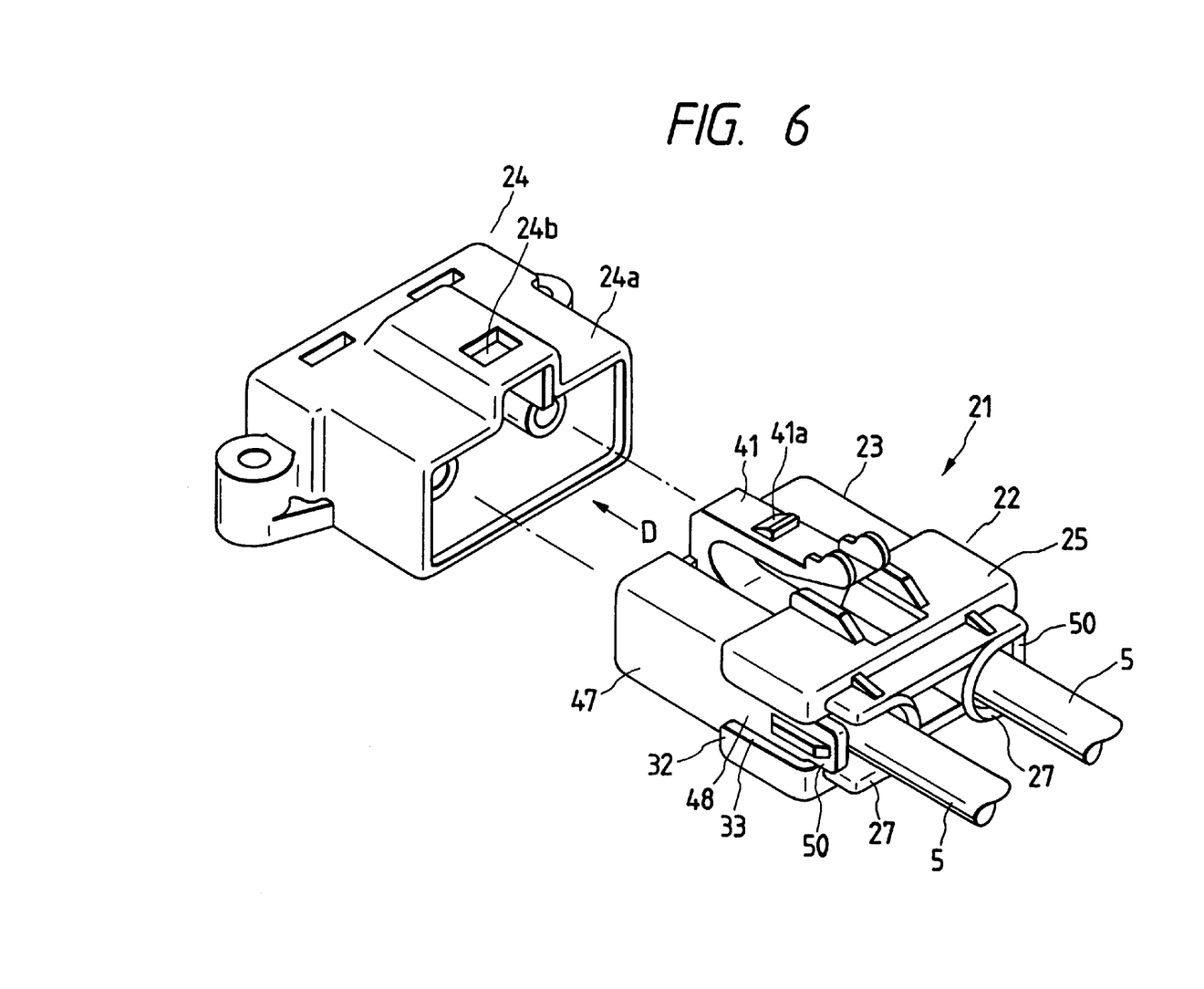
FIG. 6 is a perspective view showing the manner of connecting the optical connector to a mating connector.

FIG. 1 is an exploded, perspective view of an optical connector of the invention, FIG. 2 is a cross-sectional view of a ferrule holder taken along the line A—A of FIG. 1, FIG. 3 is a cross-sectional view of a connector housing taken along the line B—B of FIG. 1, FIG. 4 is a cross-sectional view showing the connector housing and the ferrule holder fitted together, FIG. 5 is a perspective view showing the appearance of FIG. 4, and FIG. 6 is a perspective view showing the manner of connecting the optical connector to a mating connector. Those constituent members identical to those of the conventional construction will be designated by identical reference numerals, respectively, and detailed description thereof will be omitted.

In FIG. 1, the optical connector 21 comprises optical connector plugs 2 and 2, the ferrule holder 22, and the connector housing 23. Reference numeral 24 denotes the mating connector.

As described above for the conventional construction, each of the optical connector plugs 2 and 2 comprises a photoconductive member (optical fiber) 5, and a cylindrical ferrule 6 of a synthetic resin having a smaller-diameter portion 6a and a larger-diameter portion 6b. Conductor portions (not shown) of end portions of the photoconductive members 5 and 5 are received and retained respectively in the smaller-diameter portions 6a and 6a of the two ferrules 6 and 6, and sheaths 5a of 5a of these end portions are received and retained respectively in the larger-diameter portions 6b and 6b. An engagement projection 6c for retaining a compression coil spring (resilient member) 9 is formed on each larger-diameter portion 6b.

The ferrule holder 22 includes a housing 25, made of a synthetic resin, and support walls 27 and 27 formed integrally on a rear wall 26 of the housing 25. Plug receiving chambers 28 and 28 for respectively receiving the optical connector plugs 2 and 2 are formed in the housing 25, and are open to a front end surface 29 of this housing 25. An engagement portion 30 for retaining the compression coil spring 9, as well as an elongate guide projection 31 for enabling the smooth fitting operation, is formed at the plug receiving chamber 28.

Plug-introducing slits 33, communicating respectively with the plug receiving chambers 28 and 28, are formed respectively through opposite side walls 32 and 32 of the housing 25 and also through part of the rear wall 26. A recess 35 is formed in a central portion of an upper wall 34 of the housing 25, and protection walls 36 and 36 for a lock arm 41 (described later) of the connector housing 23 engageable with the mating connector 24 are formed on the upper wall 34, and are disposed respectively on opposite sides of the recess 35. A retaining portion 38 (see FIG. 2), having an L-shaped cross-section in the direction of the axis of the ferrule holder 22, is formed at a central portion of a lower wall 37 of the housing 25, and an elastic retaining piece portion 46 (described later) of the connector housing 23 is engaged with one wall 38a of the retaining portion 38 disposed perpendicular to the axis of the ferrule holder 22, and the other wall 38b serves to protect this engaged portion.

The support walls 27 and 27 have a C-shaped cross-section in a direction perpendicular to the axis of the ferrule holder 22, and project respectively from edge portions 33a and 33a of the plug-introducing slits 33 and 33 formed on the rear wall 26, and end portions 27a and 27 of these support walls 27 and 27 are curved.

The connector housing 23 is molded of a synthetic resin, and has hollow plug-receiving chambers 39 and 39 for respectively receiving the optical connector plugs 2 and 2. The lock arm 41 for engagement with a housing 24a of the mating connector 24 is formed on a front end portion of an upper wall 40 of the connector housing 23, and a recess 43 is formed in a central portion of a lower wall 42 at a rear portion thereof, and separate the plug receiving chambers 39 and 39 from each other. A retention cancellation jig-inserting hole 45 (see FIG. 3) is formed in the connector housing 23, and extends from a front end surface 44, and communicates with the recess 43. The elastic retaining piece portion 46 for engagement with the retaining portion 38 of the ferrule holder 22 is formed at the recessed portion 43.

The provision of the retention cancellation jig-inserting hole 45 may be omitted, in which.case the recess 43 extends from the front end surface 44 to a rear end surface 49 (described later).

Slit cover portions 48 and 48, corresponding respectively to the plug-introducing slits 33 and 33 formed respectively through the opposite side walls 32 and 32 of the ferrule holder 22, are formed respectively at opposite side walls 47 and 47 of the connector housing 23. Support wall cover portions 50 and 50 of a rectangular shape, corresponding respectively to the support walls 27 and 27 of the ferrule holder 22, are formed on and extend respectively from the slit cover portions 48 and 48, and project beyond the rear end surface 49 of the connector housing 23. Guide grooves 51 and 51 for respectively receiving the elongate guide projections 31 and 31 of the ferrule holder 22 are formed respectively in the slit cover portions 48 and 48.

The assembling of the optical connector 21 of the above construction will now be described with reference to FIG. 1.

First, the compression coil springs 9 and 9 are mounted respectively on the photoconductive members 5 and 5, and then the ferrules 6 and 6 are fitted and retained respectively on the end portions of the photoconductive members 5 and 5, thereby forming the optical connector plugs 2 and 2. Then, the optical connector plugs 2 and 2 are introduced respectively into the plug receiving chambers 28 and 28 of the ferrule holder 22 through the plug-introducing slits 33 and 33, and when the ferrule holder 22 is moved toward the connector housing 23 (in a direction of arrow C), the elongate guide projections 31 and 31 are brought into sliding engagement with the guide grooves 51 and 51, respectively, and then the elastic retaining piece portion 46 is brought into engagement with the one wall 38a of the retaining portion 38, as shown in FIG. 4, so that the connector housing 23 and the ferrule holder 22 are fitted together.

As this time, as in the conventional construction, each of the optical connector plugs 2 and 2, inserted in the associated plug receiving chamber 39 of the connector housing 23, has a play (this condition is not shown in the drawings) because of the resilient force of the compression coil spring 9 acting between the engagement projection 6c of the ferrule 6 and the engagement portion 30 of the ferrule holder 22. Those portions of the plug-introducing slits 33 and 33, formed respectively through the opposite side walls 32 and 32 of the ferrule holder 32, are covered respectively with the slit cover portions 48 and 48, and also the support walls 27 and 27 are covered respectively with the support wall cover portions 50 and 50 projecting respectively from the plug-introducing slits 33 and 33, thereby preventing the disengagement of the optical connector plugs 2 and 2.

The thus assembled optical connector 21, shown in FIG. 5, can be connected to the housing 24a of the mating connector 24.

When the optical connector 21 is moved in a direction of arrow D to be connected to the mating connector as shown in FIG. 6, a retaining projection 41a, formed on the lock arm 41, is engaged in a retaining hole 24b formed in the housing 24a, so that the optical connector 21 is connected to the mating connector 24.

ADVANTAGEOUS EFFECTS OF THE INVENTION

As described above, in the present invention, the optical connector comprises the optical connector plug, the ferrule holder, and the connector housing, and when the ferrule body, in which the optical connector plug is removably received, is removably fitted in the connector housing, the optical connector is ready for connection to the housing of the mating connector. Thus, the optical connector plug is removably received in the ferrule holder, and then the ferrule holder is fitted, together with the optical connector plug, into the connector housing, and by doing so, advantageously, the assembling operation can be effected easily, and the efficiency of the operation is greatly enhanced, and also the efficiency of the maintenance is greatly enhanced, and besides the extensibility can be obtained.

In the present invention, the plug-introducing slits are formed respectively through the opposite side walls of the ferrule holder and also through part of the rear wall of the ferrule holder so that the optical connector plugs can be removably mounted on the ferrule holder, and the connector housing has the elastic retaining piece portion engageable with the ferrule holder to prevent the withdrawal of the ferrule holder from the connector housing, and the engagement of the elastic retaining piece portion can be canceled. Therefore, advantageously, the optical connector plugs and the ferrule holder can be connected together quite easily, and such a cumbersome operation as required in the conventional construction is eliminated, and the efficiency of the maintenance is greatly enhanced, and the extensibility can be obtained.

In the present invention, the support walls of a C-shaped cross-section for respectively supporting the photoconductive members are formed on the rear wall of the ferrule holder, and are disposed respectively at the edge portions of the plug-introducing slits, and therefore even though the plug-introducing slits are formed in the ferrule holder, there is achieved an advantage that the photoconductive members can be sufficiently supported.

In the present invention, the end portion of each of the support walls, formed on the rear wall of the ferrule holder, is curved, and therefore even when a bending force acts on the photoconductive member, there is achieved an advantage that this photoconductive member can be protected.

In the present invention, the slit cover portions, corresponding respectively to the plug-introducing slits formed respectively in the opposite side walls of the ferrule holder, are formed respectively on the opposite side walls of the connector housing, and therefore there is achieved an advantage that when the ferrule holder is fitted into the connector housing, the plug-introducing slits, formed respectively in the opposite side walls, are covered with the slit cover portions, respectively, thereby preventing the movement of the optical connector plugs.

In the present invention, each of the slit cover portions, formed respectively on the opposite side walls of the connector housing, has the support wall cover portion for the support wall of the ferrule holder, and these support wall cover portions project beyond the rear end surface of the connector housing, and when the connector housing and the ferrule holder are fitted together, the support wall cover portions project respectively from those portions of the plug-introducing slits disposed at the rear wall of the ferrule holder, and covers the support walls, respectively, thereby limiting the movement of the photoconductive members relative to the support walls.

In the present invention, the guide grooves are formed respectively in the slit cover portions of the connector housing, and extend in the direction of insertion of the optical connector plugs, and the elongate guide projections, corresponding respectively to the guide grooves, are formed respectively on the inner surfaces of the opposite side walls of the ferrule holder, and therefore there are achieved advantages that the assembling operation can be effected easily, and that the efficiency of the operation can be enhanced.

In the present invention, at least two plug receiving chambers for respectively receiving the optical connector plugs are formed in the connector housing, and the recessed portion is formed in the rear portion of the lower wall of the connector housing, and separates the plug receiving chambers from each other, and the elastic retaining piece portion is formed at the recessed portion, and the retaining portion for the elastic retaining piece portion is formed on the lower wall of the ferrule holder, and therefore there is achieved an advantage that the space efficiency is greatly enhanced as compared with the conventional optical connector.

In the present invention, the retaining portion, formed on the lower wall of the ferrule holder, has an L-shaped cross-section in the direction of the axis of the ferrule holder, and one wall of this retaining portion is engaged with the elastic retaining piece portion, and the other wall thereof serves to protect the engagement of the elastic retaining piece portion, and therefore there is achieved an advantage that the ferrule holder is prevented from being easily disengaged from the connector housing by an external force.

In the present invention, the retention cancellation jig-inserting hole is formed in the connector housing, and extends from the front end surface of the connector housing, and communicates with the recessed portion, and therefore there is achieved an advantage that the ferrule holder can be easily withdrawn from the connector housing.

What is claimed is:

1. An optical connector comprising:
   an optical connector plug including a photoconductive member;
   a ferrule receiving and retaining an end portion of said photoconductive member therein;
   a ferrule holder urging said ferrule through a resilient member mounted on said optical connector plug, said optical connector plug being removably received in said ferrule holder without requiring removal of said ferrule from said optical connector plus; and a connector housing for fitting a housing of a mating connector, wherein said ferrule holder is removably is removably fitted in said connector housing.

2. An optical connector according to claim 1, in which plug-introducing slits are formed respectively through opposite side walls of said ferrule holder and also through part of a rear wall of said ferrule holder so that said optical connector plugs can be removably mounted on said ferrule holder, and said connector housing has an elastic retaining piece portion engageable with said ferrule holder to prevent the withdrawal of said ferrule holder from said connector housing, and the engagement of said elastic retaining piece portion can be canceled.

3. An optical connector according to claim 2, in which support walls of a C-shaped cross-section for respectively supporting said photoconductive members are disposed respectively at edge portions of said plug-introducing slits formed on the rear wall of said ferrule holder.

4. An optical connector according to claim 3, in which an end portion of each of said support walls is curved.

5. An optical connector according to claim 2, in which slit cover portions, corresponding respectively to said plug-introducing slits formed respectively in the opposite side walls of said ferrule holder, are formed respectively on opposite side walls of said connector housing.

6. An optical connector according to claim 5, in which each of said slit cover portions has a support wall cover portion projecting beyond a rear end surface of said connector housing, and when said connector housing and said ferrule holder are fitted together, said support wall cover portions project respectively from those portions of said plug-introducing slits disposed at the rear wall of said ferrule holder, and face said support walls, respectively.

7. An optical connector according to claim 5, in which guide grooves are formed respectively in said slit cover portions of said connector housing, and extend in a direction of insertion of said optical connector plugs, and elongate guide projections, corresponding respectively to said guide grooves, are formed respectively on inner surfaces of the opposite side walls of said ferrule holder.

8. An optical connector according to claim 6, in which guide grooves are formed respectively in said slit cover portions of said connector housing, and extend in a direction of insertion of said optical connector plugs, and elongate guide projections, corresponding respectively to said guide grooves, are formed respectively on inner surfaces of the opposite side walls of said ferrule holder.

9. An optical connector according to claim 2, in which at least two plug receiving chambers for respectively receiving said optical connector plugs are formed in said connector housing, and a recessed portion is formed in a rear portion of a lower wall of said connector housing, and separates said plug receiving chambers from each other, and said elastic retaining piece portion is formed at said recessed portion, and a retaining portion for said elastic retaining piece portion is formed on a lower wall of said ferrule holder.

10. An optical connector according to claim 8, in which said retaining portion has an L-shaped cross-section in a direction of an axis of said ferrule holder, and one wall of said retaining portion is engaged with said elastic retaining piece portion, and the other wall thereof serves to protect the engagement of said elastic retaining piece portion.

11. An optical connector according to claim 8, in which a retention cancellation jig-inserting hole is formed in said connector housing, and extends from a front end surface of said connector housing, and communicates with said recessed portion.

* * * * *